US008478488B2

(12) United States Patent
Tustanowski et al.

(10) Patent No.: US 8,478,488 B2
(45) Date of Patent: Jul. 2, 2013

(54) IMPACT EVENT COUNTERMEASURE CONTROL METHOD AND SYSTEM FOR AUTOMOTIVE VEHICLE

(75) Inventors: Rachelle Tustanowski, Livonia, MI (US); Todd Clark, Dearborn, MI (US); Jeff Vinton, Farmington Hills, MI (US); William Sherwood, Royal Oak, MI (US)

(73) Assignee: Ford Global Technologies, Dearborn, MI (US)

( * ) Notice: Subject to any disclaimer, the term of this patent is extended or adjusted under 35 U.S.C. 154(b) by 1867 days.

(21) Appl. No.: 11/308,468

(22) Filed: Mar. 28, 2006

(65) Prior Publication Data

US 2007/0233346 A1    Oct. 4, 2007

(51) Int. Cl.
 B60R 21/0136  (2006.01)
 B60R 21/05  (2006.01)
 G06F 19/00  (2006.01)
 G06F 17/00  (2006.01)

(52) U.S. Cl.
 USPC ............... 701/45; 701/46; 280/734; 280/735

(58) Field of Classification Search
 USPC ............... 701/45, 46, 47; 280/734, 735, 736, 280/743.2, 742, 748, 750, 728.1, 730.1, 729, 280/733
 See application file for complete search history.

(56) References Cited

U.S. PATENT DOCUMENTS

| | | | |
|---|---|---|---|
| 5,607,118 A | 3/1997 | Dybro et al. | |
| 5,611,498 A | 3/1997 | Miller, III et al. | |
| 5,787,377 A * | 7/1998 | Watanabe et al. | 701/45 |
| 5,900,677 A | 5/1999 | Musiol et al. | |
| 6,188,940 B1 * | 2/2001 | Blackburn et al. | 701/45 |
| 6,236,922 B1 * | 5/2001 | Andres | 701/45 |
| 6,252,240 B1 * | 6/2001 | Gillis et al. | 250/559.38 |
| 6,409,115 B1 | 6/2002 | Specht et al. | |
| 6,481,659 B1 | 11/2002 | Ashtiani et al. | |
| 6,804,595 B1 | 10/2004 | Quail et al. | |
| 6,915,196 B2 * | 7/2005 | Rao et al. | 701/45 |
| 6,997,474 B2 * | 2/2006 | Midorikawa et al. | 280/735 |
| 7,188,012 B2 * | 3/2007 | Salmeen et al. | 701/45 |
| 2005/0065688 A1 * | 3/2005 | Rao et al. | 701/45 |
| 2005/0134101 A1 | 6/2005 | Hiramatsu et al. | |
| 2005/0139711 A1 | 6/2005 | Bell et al. | |

* cited by examiner

*Primary Examiner* — Thomas Tarcza
*Assistant Examiner* — Edward Pipala
(74) *Attorney, Agent, or Firm* — Jerome R Drouillard; Frank MacKenzie

(57) ABSTRACT

An impact event countermeasure control method and system for an automotive vehicle includes management of impact countermeasures using not only variable timing responsive to impact severity, but also event control as a function of the displacement of a vehicle's occupant with respect to the passenger cabin environment, including various countermeasure devices.

17 Claims, 3 Drawing Sheets

IMPACT EVENT COUNTERMEASURE CONTROL METHOD AND SYSTEM FOR AUTOMOTIVE VEHICLE

BACKGROUND OF THE INVENTION

The present invention relates to a method and system for enhancing the protection of motor vehicle occupants during an impact event, through the use of adaptively controlled countermeasures.

Impact event countermeasure devices used in automotive vehicles have become increasingly more complex as time has progressed. Beginning with simple seatbelts, which at one time were limited solely to lap belts, and then later, lap belts with shoulder harnesses, countermeasure devices have passed through a lengthy evolution to a point at which even basic restraints include not only lap and shoulder belts, but also seatbelt buckle pretensioners and seatbelt retractor multi-load limiters.

In addition to seatbelts, supplemental restraint systems often include an airbag mounted within the steering wheel of a vehicle, as well as an airbag mounted within the dash panel adjacent a front seat passenger, as well as side airbags mounted upon vehicle seats, and side curtain inflatable devices. Other countermeasures include, for example, airbag inflators with multiple volume capability, and inflators with venting capability. An adaptive steering column is used in some vehicles to mitigate the impact load delivered to the chest area of a vehicle's driver during an impact event. In one incarnation, a multi-load level steering column controls the stroke, and hence, the load imposed by the steering column, during a frontal impact.

All of the countermeasure devices described above require proper time and force management in order to properly control the interaction of a vehicle occupant with his/her surroundings during an impact event. U.S. Pat. No. 6,804,595 discloses a system in which variety of sensors such as an occupant weight sensor, an occupant proximity sensor, a crash severity sensor, and a pre-crash sensor are used to provide signals controlling an airbag and seatbelt mechanism. The system of the '595 patent does not, however, provide for the unique combination of crash severity sensing, occupant position sensing, and occupant displacement prediction provided by the present system so as to manage the energy of an occupant in a unique and inventive manner.

SUMMARY OF THE INVENTION

An impact event countermeasure control method for an automotive vehicle includes the steps of sensing deceleration of the vehicle during an impact event, setting a countermeasure deployment timer in the event that the sensed deceleration exceeds a first threshold, and integrating the sensed deceleration to calculate the time-based displacement of an occupant within the vehicle. The calculated displacement of the occupant is compared with a displacement threshold at the time the countermeasure deployment timer expires. In the event that the calculated displacement is less than the displacement threshold when the countermeasure deployment timer measure expires, the deployment of the countermeasure will be delayed until the displacement threshold is crossed. Crossing of the first deceleration threshold may be used, for example, as a factor in the decision making leading to deployment of a seatbelt pretensioner or other countermeasure device. The setting of the countermeasure deployment timer preferably lags the onset of the impact event by an amount of time corresponding to the severity of the impact event.

The displacement threshold used in the present method is preferably calculated as a function of at least one physical characteristic of the occupant, which may for example be the longitudinal position at which a seated occupant places a seat, or perhaps, the weight of the occupant. A family of displacement thresholds may be calculated for plurality of occupant physical characteristics.

Returning to the present method, in the event that the calculated displacement of a vehicle occupant is greater than the displacement threshold when the countermeasure timer expires, the countermeasure will be deployed when timeout has been reached. According to the present method, the countermeasure deployed in this manner may include, without limitation, a multi-load level (MLL) seatbelt retractor, or an adaptive steering column (ASC), or an adaptive airbag tether (AAT), or adaptive airbag canister vent (AACV), or yet other countermeasures known to those skilled in the art and suggested by this disclosure.

According to another aspect of the present invention, an impact event countermeasure control system for an automotive vehicle includes at least one sensor for determining deceleration, if any, of the vehicle during an impact event, as well as a countermeasure deployment timer which is initialized in the event that the determined deceleration exceeds a first threshold. An integrator using the sensed deceleration as an input calculates the time-based displacement of an occupant within the vehicle. A comparator compares the calculated displacement of the occupant with a displacement threshold at the time the countermeasure deployment timer expires. Finally, a controller, which includes a countermeasure deployment timer, as well as the integrator and the comparator, deploys an impact countermeasure in the event that the calculated displacement of the occupant is greater than the displacement threshold when the countermeasure timer expires.

It is an advantage of a system and method according to the present invention that the deployment of various countermeasures may be controlled as a function of not only the severity of an impact event, but also as a function of whether the occupant is properly seated with a buckled seatbelt, and further as a function of the fore-and-aft location of a vehicle seat in which an occupant is seated, and also as a function of the displacement of the vehicle's occupant with respect to a seat and/or various countermeasure systems.

It is a further advantage of a method and system according to the present invention that the logic of the present method and system may be employed with a plurality of different countermeasure devices having different response characteristics and calibration requirements. This permits vehicle development engineers to apply either new or modified countermeasure devices without the necessity of re-engineering the entire countermeasure control system.

Other advantages, as well as features and objects of the present invention, will become apparent to the reader of this specification.

DETAILED DESCRIPTION OF THE PREFERRED EMBODIMENTS

Figure 1:
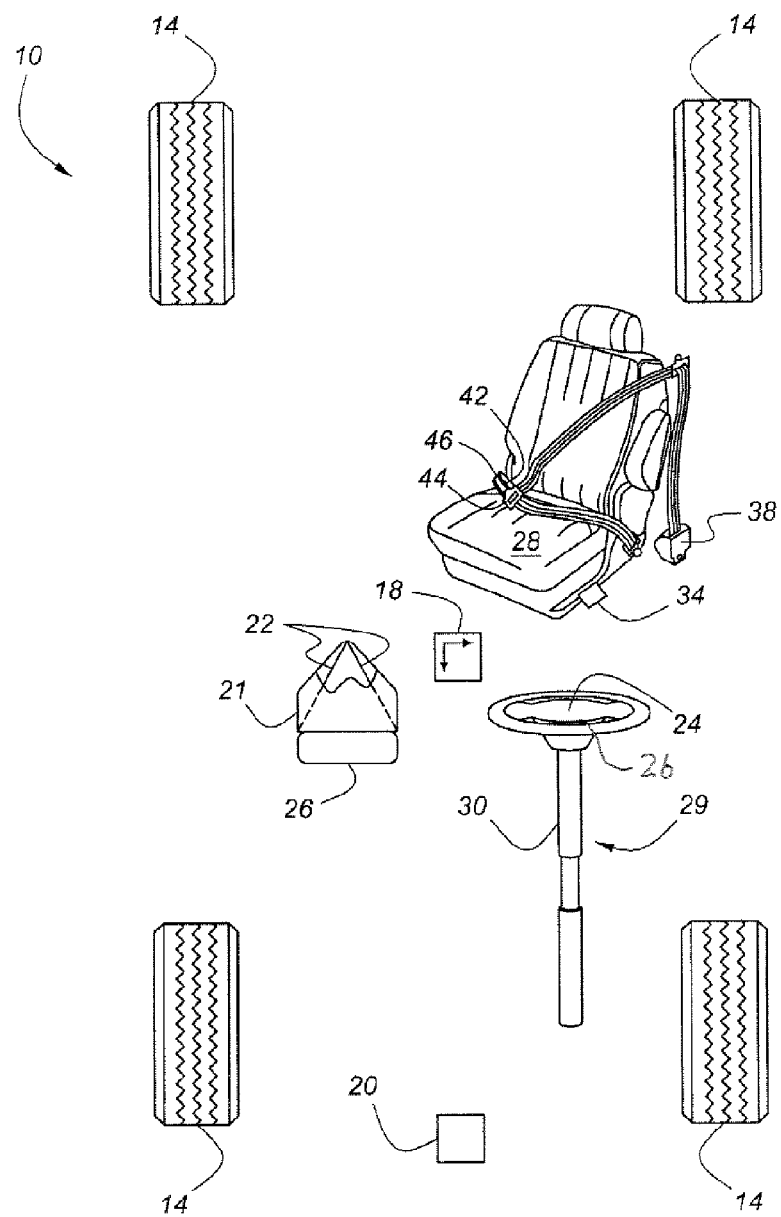
FIG. 1 is a schematic representation of a portion of a vehicle having an impact event countermeasure control system according to the present invention.

Vehicle 10 is shown schematically in a partial plan view in FIG. 1. Vehicle 10 has four road wheels, 14, and at least one occupant seat, 28, which is equipped with a seat track location sensor system, 34, a MLL, 38, and a seatbelt pretensioner, 42. The MLL is but one example of the countermeasures employed in vehicle 10. Those skilled in the art will appreciate in view of this disclosure, that the present method and the system may be used to control any one or all of the countermeasures disclosed in this specification, or yet other types of countermeasures not disclosed in this specification but known to those skilled in the art and suggested by this disclosure.

The purpose of seat track position sensor 34 is to alert system controller 18 as to the fore and aft position within vehicle 10, at which an occupant has placed seat 28. If seat 28 is in its rearwardmost position, it may be assumed that a person of larger stature is occupying the seat. The present inventive system may use this information to control airbag 24 and adaptive canister vent 26, as well as adaptive steering column 30, which is part of steering column system 29, and which offers a controlled longitudinal collapse characteristic.

Adaptive airbag tether 22 is used to control the shape of airbag 21 in response to commands of countermeasure system controller 18. Adaptive canister vent 26 controls the amount of gas or, more precisely, the venting of the gas provided by a gas source, such as a pyrotechnic device. All of the countermeasure devices such as AAT 22, AACV 26, MLL 38, and ASC 30 are all connected with system controller 18, as is accelerometer 20.

Figure 2:
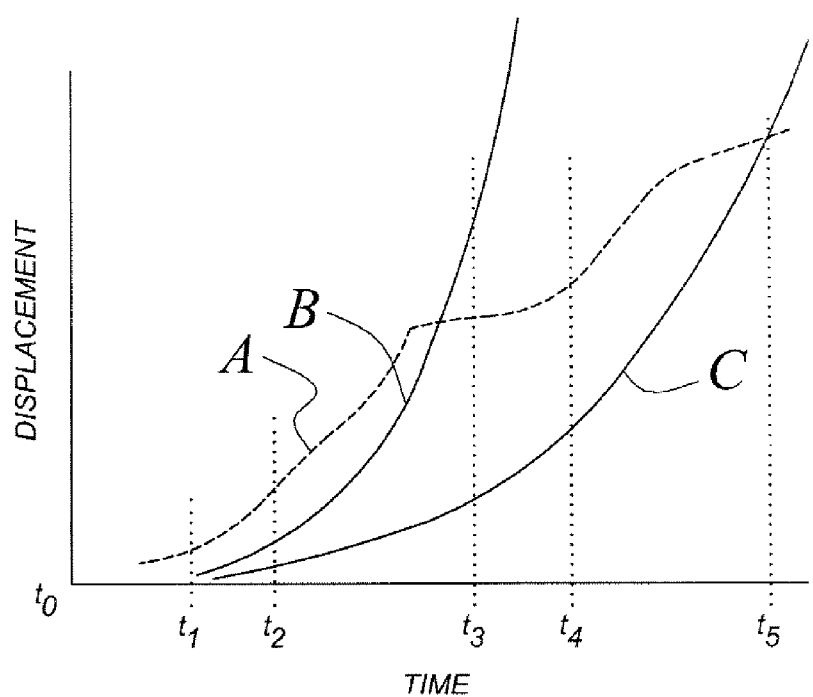
FIG. 2 is a plot showing time response characteristics of a method and system according to the present invention.

FIG. 2 illustrates several of the time/event relationships of the present control system and method. An impact event starts at time zero ($t_0$), followed closely by sensing of an acceleration corresponding to an impact of the vehicle with an object sufficient to warrant the use of countermeasures. Thus, at time $t_1$, an impact of vehicle 10 with an object has been sensed by accelerometers which are either distributed about vehicle 10, as is accelerometer 20, or by one or more accelerometers sited within system controller 18. In any event, a first timer, also within controller 18, is set at time $t_1$. This first timer expires at time $t_3$. A second timer which is set at time $t_2$, expires at time $t_4$. Thus, the present system accommodates multiple impact events.

Curve A of FIG. 2 is a displacement threshold curve which, if crossed, indicates that deployment of a countermeasure device should be considered. In general, Curve A corresponds to the displacement of an individual within the vehicle with respect to a countermeasure device such as an ASC, or an MLL. Curve A is generally calculated by performing a two-step integration of the sensed vehicle acceleration. As the value of Curve A increases, the distance between an occupant of a vehicle and a facing countermeasure device is decreasing, indicating either that deployment of the countermeasure device should be initiated, or that a performance characteristic of the countermeasure device should be modified. For example, with a MLL 38, it may become advisable to release the load limiter if the occupant of the vehicle comes within a certain distance of the airbag. For ASC 30, it may be necessary to allow stroking, or telescopic collapse, of steering column system 29 to a greater or lesser extent, depending upon the proximity of the vehicle's occupant to the steering column. Controller 18 may calculate a family of curves similar to curve A, employing seat usage characteristics, sometimes called Occupant Classification Sensing, such as an occupant's position, seatbelt usage, and occupant weight. These characteristics are determined by sensors such as seat track position sensor 34.

Curves B and C of FIG. 2 illustrate the calculated displacement of a vehicle's occupants during impact events of varying severity. Curves B and C are but two examples of a family of curves evaluated by system controller 18. Curve B corresponds to a relatively more severe impact, such as an impact with a fixed barrier. Curve C corresponds to an impact with a delayed severity, such as an impact against an offset deformable barrier. With Curve B, the displacement of the occupant crosses displacement threshold Curve A before time $t_3$ has been reached, and as a result, a countermeasure device will be employed at time $t_3$. However, with the impact event illustrated by Curve C, the displacement of the occupant at time $t_4$ has not crossed threshold displacement Curve A, and such crossing does not incur until time $t_5$. Accordingly, countermeasure devices will generally not be deployed until time $t_5$ has been reached.

Figure 3:
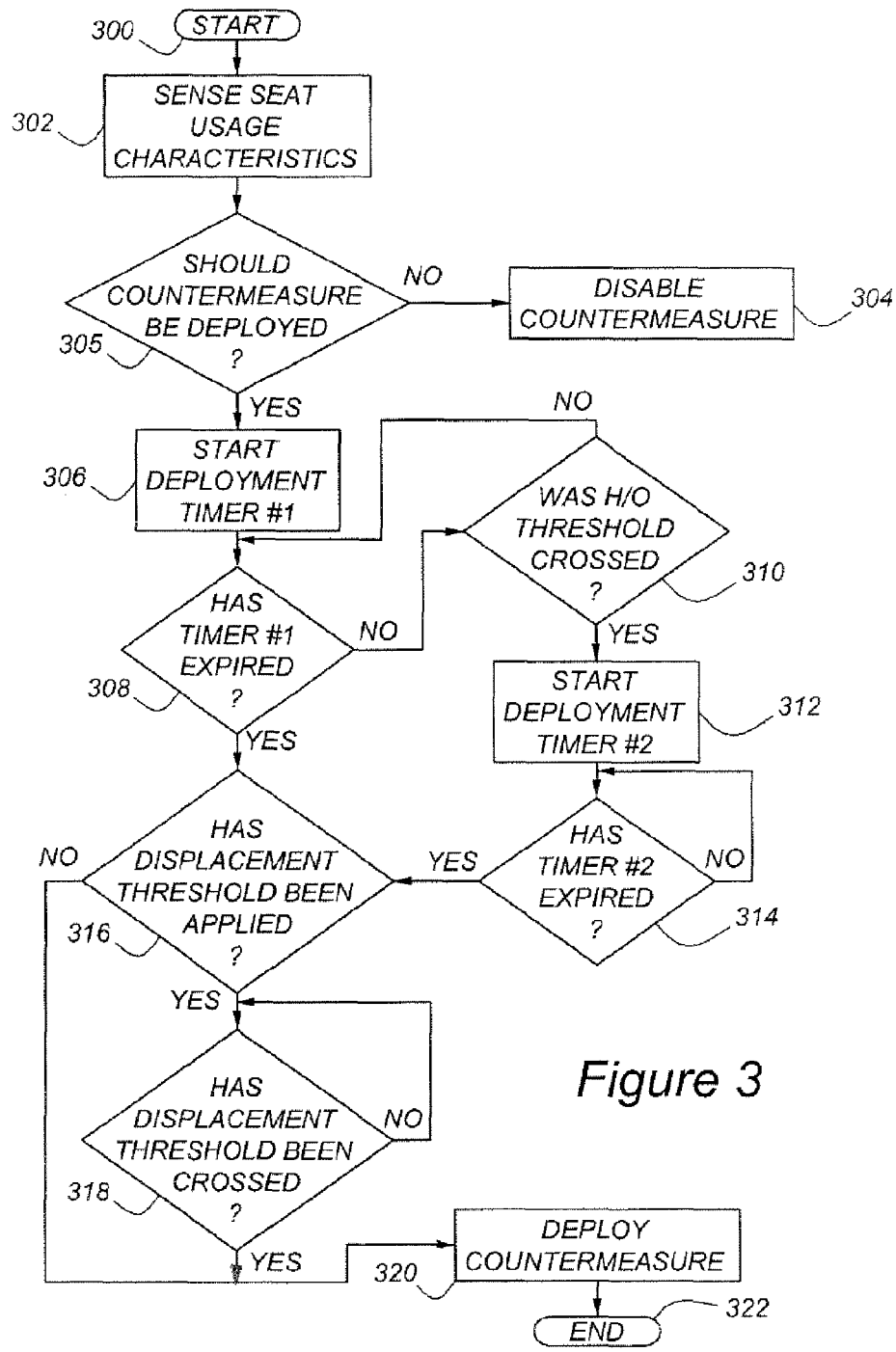
FIG. 3 is a flow diagram showing operation of a countermeasure control system according to the present invention.

FIG. 3 is a flow chart according to the present invention which generally follows the logic of FIG. 2. Each of the family of curves within controller 18 having the purpose of occupant tracking, as explained in connection with curves B and C of FIG. 2, may be monitored using the logic of FIG. 3. The routine starts at block 300 and moves to block 302, wherein the occupant seat usage characteristics are determined. These characteristics may include buckle status as determined by means of seatbelt buckle sensor 44 (FIG. 1), or seat position, as determined by sensor 34 (FIG. 1), or occupant weight. Controller 18 uses a measured seat usage characteristic at block 305 to determine whether any particular countermeasure should be deployed. If the answer at block 305 is negative, a countermeasure device such as an ACV will be disabled at block 304.

If the routine running within controller 18 reaches an affirmative conclusion at block 305, the routine moves to block 306, wherein deployment timer 1, corresponding to the timer set at time $t_1$ of FIG. 2, is started. This timer may be set in response, for example, to a low severity impact. Moving to block 308, if timer 1 has not expired, the routine moves to block 310 wherein a question is posed as to whether a high output threshold has been crossed. In other words, the inquiry deals with whether a high-rate of deceleration has been sensed, as would occur when striking a rigid barrier. If the answer is "no" at block 310, the routine continues with block 308. If, however, the answer is "yes" at block 310, the routine moves to block 312, wherein a second deployment timer, which corresponds to the timer set at time $t_2$ in FIG. 2, is started.

At block 314, if timer 2 has not expired, the timer is allowed to count down. If, however, at block 314 timer 2 has expired, the routine moves to block 316. Block 316 is also reached via block 308, if the answer to the question posed in block 308 is affirmative. At block 316, a question is asked regarding whether a displacement threshold, as exemplified by Curve A of FIG. 2, has been applied to the countermeasure control system. If a displacement threshold has not been applied, the routine moves to block 320 wherein the countermeasure device is deployed immediately. If however, a displacement threshold has been applied, as verified at block 316, the routine moves to block 318, wherein a question is asked regarding whether a vehicle occupant calculation being tracked by the routine, has crossed the displacement threshold. If the vehicle occupant has not crossed the displacement threshold at block 318, the routine continues to track the calculated occupant displacement at block 318. If however, the occupant has crossed the displacement threshold at block 318, the routine moves once again to block 320 wherein the countermeasure is deployed. Then, the routine ends at block 322.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. An impact event countermeasure control method for an automotive vehicle, comprising the steps of:
    sensing deceleration of the vehicle during an impact event;
    setting a countermeasure deployment timer in the event that said sensed deceleration exceeds a first threshold;
    integrating said sensed deceleration to calculate the time-based displacement of an occupant within said vehicle;
    comparing the calculated displacement of said occupant with a displacement threshold at the time said countermeasure deployment timer expires; and
    in the event that said calculated displacement is less than said displacement threshold when said countermeasure deployment timer expires, delaying deployment of a countermeasure until said displacement threshold is crossed.

2. A method according to claim 1, wherein said first threshold comprises a seatbelt pre-tensioner threshold.

3. A method according to claim 1, wherein the setting of said countermeasure deployment timer lags the onset of said impact event by an amount of time corresponding to the severity of the impact event.

4. A method according to claim 1, wherein said displacement threshold is calculated as a function of at least a seat usage characteristic of said occupant.

5. A method according to claim 4, wherein said seat usage characteristic comprises a longitudinal position at which a seated occupant places a seat.

6. A method according to claim 1, wherein a family of displacement thresholds is calculated for a plurality of occupant seat usage characteristics.

7. A method according to claim 1, wherein in the event that said calculated displacement is greater than said displacement threshold when said countermeasure deployment timer expires, said countermeasure will be deployed when said countermeasure timer times out.

8. A method according to claim 1, wherein said countermeasure comprises a multi-load level (MLL) seatbelt retractor.

9. A method according to claim 1, wherein said countermeasure comprises an adaptive steering column (ASC).

10. A method according to claim 1, wherein said countermeasure comprises an adaptive airbag tether (AAT).

11. A method according to claim 1, wherein said countermeasure comprises an adaptive airbag canister vent (ACV).

12. An impact event countermeasure control system for an automotive vehicle, comprising:
    a sensor for determining the deceleration of the vehicle during an impact event;
    a countermeasure deployment timer which is set in the event that the determined deceleration exceeds a first threshold;
    an integrator using said sensed deceleration to calculate the time-based displacement of an occupant within said vehicle;
    a comparator for comparing the calculated displacement of said occupant with a displacement threshold at the time said countermeasure deployment timer expires; and
    a controller, comprising said countermeasure deployment timer, said integrator, and said comparator, with said controller deploying an impact countermeasure in the event that said calculated displacement is greater than said displacement threshold when said countermeasure timer expires.

13. A countermeasure control system according to claim 12, wherein said countermeasure comprises a multi-load level (MLL) seatbelt retractor.

14. A countermeasure control system according to claim 12, wherein said countermeasure comprises an adaptive steering column (ASC).

15. A countermeasure control system according to claim 12, wherein said countermeasure comprises an adaptive airbag tether (AAT).

16. A countermeasure control system according to claim 12, wherein said countermeasure comprises an adaptive airbag canister vent (ACV).

17. A countermeasure control system according to claim 12, wherein said displacement is determined with respect to the location of a countermeasure device within said vehicle.

* * * * *